United States Patent
Perrin et al.

(10) Patent No.: US 9,756,977 B2
(45) Date of Patent: Sep. 12, 2017

(54) BEVERAGE DISPENSING SYSTEM, METHOD FOR PROVIDING A MULTI-LAYERED BEVERAGE, AND INGREDIENTS CONTAINER FOR USE THEREOF

(71) Applicant: NESTEC S.A., Vevey (CH)

(72) Inventors: Alexa Perrin, Savigny (CH); Flavien Dubief, Neuchatel (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 15/032,873

(22) PCT Filed: Oct. 23, 2014

(86) PCT No.: PCT/EP2014/072720
§ 371 (c)(1),
(2) Date: Apr. 28, 2016

(87) PCT Pub. No.: WO2015/062959
PCT Pub. Date: May 7, 2015

(65) Prior Publication Data
US 2016/0249765 A1    Sep. 1, 2016

(30) Foreign Application Priority Data
Oct. 28, 2013  (EP) ..................... 13190417

(51) Int. Cl.
*B65B 1/04*      (2006.01)
*A47J 31/44*     (2006.01)
(Continued)

(52) U.S. Cl.
CPC .......... *A47J 31/4496* (2013.01); *A47J 31/41* (2013.01); *A47J 31/46* (2013.01); *A47J 2203/00* (2013.01)

(58) Field of Classification Search
CPC .. A47J 31/4492; A47J 31/4496; A47J 31/002; A47J 31/40; A47J 31/402;
(Continued)

(56) References Cited

U.S. PATENT DOCUMENTS 2,740,571 A * 4/1956 Busto ................. A47G 21/00
                                              141/104
4,211,342 A * 7/1980 Jamgochian ......... B67D 1/0036
                                              222/129.4
(Continued)

FOREIGN PATENT DOCUMENTS

DE    102006018352    9/2007

*Primary Examiner* — Patrick M Buechner
*Assistant Examiner* — Randall Gruby
(74) *Attorney, Agent, or Firm* — K&L Gates LLP (57) ABSTRACT

The present invention concerns a beverage dispensing system for providing a multi-layered beverage is disclosed. The beverage dispensing system is adapted to prepare a plurality of beverages of different densities within a plurality of ingredients container. The beverage dispensing system separately and sequentially dispenses a lower density beverage prior to dispensing a higher density beverage. The beverages are dispensed via a delivery tube which is disposed proximally to an internal base of a drinks receptacle. Furthermore an ingredients container is disclosed. Furthermore a method for the manufacture of the multi-layered beverage is disclosed.

13 Claims, 4 Drawing Sheets

(51) Int. Cl.
*A47J 31/41* (2006.01)
*A47J 31/46* (2006.01)

(58) Field of Classification Search
CPC ...... A47J 31/401; A47J 31/404; A47J 31/405; A47J 31/407; A47J 31/41; A47J 31/46; B67D 1/0041; B67D 1/0888; B67D 1/0021–1/0035; G06Q 10/06; G06Q 50/12; G07F 17/0078
USPC ................ 99/280, 295, 300, 325, 485, 486; 426/231, 433, 430, 431, 432, 435, 429, 426/523, 590, 594, 597
See application file for complete search history.

(56) References Cited

U.S. PATENT DOCUMENTS

| | | | | |
|---|---|---|---|---|
| 4,818,544 A * | 4/1989 | Seward | ............ | B65D 85/8043 206/0.5 |
| 4,960,042 A * | 10/1990 | Grossi | ............... | A47J 31/4485 137/893 |
| 5,072,660 A * | 12/1991 | Helbling | ............... | A47J 31/007 426/112 |
| 5,163,488 A * | 11/1992 | Basch | ...................... | A47J 43/27 141/100 |
| 6,099,878 A * | 8/2000 | Arksey | .................... | A47J 31/24 426/231 |
| 6,358,545 B1 * | 3/2002 | Chandler | ........... | B65D 85/8043 222/129.1 |
| 6,390,966 B2 * | 5/2002 | Anderson | ............... | B01L 99/00 494/37 |
| 6,840,158 B2 * | 1/2005 | Cai | ...................... | A47J 31/0668 99/293 |
| 7,537,138 B2 * | 5/2009 | Saggin | ................... | A47J 31/002 222/1 |
| 7,607,385 B2 * | 10/2009 | Halliday | ............. | A47J 31/0673 99/280 |
| 7,927,642 B2 * | 4/2011 | Campetella | ......... | A47J 31/3609 426/433 |
| 8,056,588 B2 * | 11/2011 | Somerby | ............... | B01F 13/002 141/104 |
| 8,844,426 B2 * | 9/2014 | Ochoa | .................... | A23L 33/10 206/220 |
| 8,931,525 B2 * | 1/2015 | Kinds | .................... | A47J 31/002 141/104 |
| 9,474,406 B2 * | 10/2016 | Smith | ....................... | A23F 3/18 |
| 2004/0084475 A1 * | 5/2004 | Bethuy | ................ | B67D 1/0032 222/1 |
| 2005/0095341 A1 * | 5/2005 | Sher | ........................ | A23F 5/243 426/594 |
| 2005/0258082 A1 * | 11/2005 | Lund | ....................... | C02F 1/003 210/101 |
| 2007/0164046 A1 * | 7/2007 | Nighy | .................. | B67D 1/0025 222/129.1 |
| 2007/0202227 A1 * | 8/2007 | Thakur | ................... | A23F 5/405 426/477 |
| 2007/0235103 A1 * | 10/2007 | Taverna | ................. | A47G 19/00 141/100 |
| 2007/0254080 A1 * | 11/2007 | Schackmuth | .......... | G06Q 10/06 426/523 |
| 2008/0023488 A1 * | 1/2008 | Guerrero | .............. | B67D 1/0001 222/129.4 |
| 2008/0241322 A1 * | 10/2008 | Bunge | ................... | A47J 31/002 426/238 |
| 2009/0013876 A1 * | 1/2009 | Ranzoni | ............... | A47J 31/4496 99/303 |
| 2009/0155422 A1 * | 6/2009 | Ozanne | ................ | A47J 31/0615 426/89 |
| 2010/0078480 A1 * | 4/2010 | Aker | ................. | G06K 19/06009 235/462.08 |
| 2011/0108570 A1 * | 5/2011 | Jarisch | ..................... | A47J 31/40 99/453 |
| 2013/0014648 A1 * | 1/2013 | Rognon | .................. | A47J 31/3623 99/280 |
| 2013/0062366 A1 * | 3/2013 | Tansey | ..................... | A47J 31/44 222/102 |
| 2013/0129872 A1 * | 5/2013 | Kruger | ................. | A47J 31/4492 426/115 |
| 2013/0129876 A1 * | 5/2013 | Ye | ........................ | A47J 31/3623 426/232 |
| 2014/0065266 A1 * | 3/2014 | Shalev | ................... | A47J 31/407 426/89 |
| 2014/0079855 A1 * | 3/2014 | Yokoo | ................... | B65D 85/8043 426/432 |
| 2014/0224130 A1 * | 8/2014 | Castellani | ............ | A47J 31/4492 99/295 |
| 2014/0287104 A1 * | 9/2014 | Austin | ............... | B65D 85/8043 426/115 |
| 2015/0266665 A1 * | 9/2015 | Flick | .................. | B65D 81/3294 426/115 |
| 2016/0107873 A1 * | 4/2016 | Callaghan | ............ | B67D 1/0035 222/94 |
| 2016/0143474 A1 * | 5/2016 | Wessels | ................... | A47J 31/52 426/231 |
| 2016/0159632 A1 * | 6/2016 | Wheatley | ............ | G06F 19/3475 222/1 |
| 2016/0318689 A1 * | 11/2016 | Rudick | .................... | A47J 31/24 |
| 2016/0376140 A1 * | 12/2016 | Tansey, Jr. | ............. | A47J 31/44 700/236 |

\* cited by examiner

BEVERAGE DISPENSING SYSTEM, METHOD FOR PROVIDING A MULTI-LAYERED BEVERAGE, AND INGREDIENTS CONTAINER FOR USE THEREOF

CROSS REFERENCE TO RELATED APPLICATIONS

The present application is a National Stage of International Application No. PCT/EP2014/072720, filed on Oct. 23, 2014, which claims priority to European Patent Application No. 13190417.9, filed Oct. 28, 2013, the entire contents of which are being incorporated herein by reference.

FIELD OF THE INVENTION

The present invention relates to beverage dispensing. In particular the present invention relates to providing a multi-layered beverage through a beverage dispensing system. Furthermore the present invention relates to an ingredients container. Furthermore the present invention relates to a method for the manufacture of a multi-layered beverage.

BACKGROUND OF THE INVENTION

Beverage dispensing systems for the manufacture of a multi-layered beverage are known in the art. Such beverage dispensing systems separately and sequentially dispense a plurality of beverages in a drinks receptacle for the manufacture of the multi-layered beverage.

A prior art document EP 2565258 (Lin, Bo) discloses a beverage dispensing system (Rainbow cocktail maker) for the manufacture of a multi-layered beverage. In the Rainbow cocktail maker, each beverage is separately added to a measuring cup, the Rainbow cocktail maker sprays a beverage from a rotating nozzle onto the internal walls of a drinks receptacle. The measuring cup is then manually replenished with a sequential beverage and the Rainbow cocktail maker sprays the sequential beverage from the rotating nozzle onto the internal walls of the drinks receptacle for the manufacture of the multi-layered beverage.

The disclosure of EP 2565258 has certain disadvantages. Spraying of the beverages leads to a foamed dispensed beverage, this means that when a sequential beverage is sprayed there is mixing of the beverages at the foamed interfaces and thus manufacture of the multi-layered beverage is not desirable. A mixing of the plurality of beverages occurs due to a relatively high speed at which the plurality of beverages is dispensed via a centrifugal force of the rotating nozzle into the drinks receptacle and thus manufacture of the multi-layered beverage is not always possible. A replenishment of the measuring cup is time consuming for the operator. The measuring cup contains remains of the previous beverage which mixes with the sequential beverage and thus manufacture of the multi-layered beverage is not always possible. A cleaning of the measuring cup prior to the addition of each sequential beverage prior to it being dispensed is required.

A prior art document EP 1681969 (Nestec SA) discloses a beverage dispensing system for the manufacture of a multi-layered beverage. The beverage dispensing system dispenses separately and sequentially a plurality of beverages from a concentrate, such that the beverages are dispensed via a nozzle from the top of a drinks receptacle.

The disclosure of EP 1681969 has certain disadvantages. Since the beverage dispensing system dispenses separately and sequentially a plurality of beverages from the top of the drinks receptacle there is a risk that the mixing of the beverages occurs and thus manufacture of the multi-layered beverage is not always possible. A dispensing speed and pressure of the dispensed beverages needs to be carefully monitored to ensure adequate manufacture of the multi-layered beverage. It is required that the nozzle is moved relative to the drinks receptacle prior to dispensing each sequential beverage to enable manufacture of the multi-layered beverage, this renders the beverage dispensing system more complex.

There is a need to provide a beverage dispensing system which overcomes the aforementioned drawbacks of the prior art. There is also a need to provide an ingredients container adapted for use with a beverage dispensing system that overcomes the aforementioned drawbacks of the prior art. There is also a need to provide a method for the manufacture of a multi-layered beverage that overcomes the aforementioned drawbacks of the prior art.

SUMMARY OF THE INVENTION

The invention solves the above mentioned drawbacks of the existing systems, with a beverage dispensing system as claimed in the following claims.

In a first aspect, the present invention relates to a beverage dispensing system. The beverage dispensing system comprises a plurality of ingredients containers. The beverage dispensing system also preferably comprises a liquid supply which is adapted to provide a liquid to the plurality of ingredients containers, at least to those which contain a dilutable ingredient. Furthermore each one of the plurality of ingredients containers comprises an ingredient which forms a beverage with a density different to each other beverage formed in each other one of the plurality of ingredients containers. The beverage dispensing system is adapted to dispense separately and sequentially a lower density beverage prior to dispensing a higher density beverage. The beverages are dispensed via a delivery tube, the dispensing end of which is placed adjacent to the internal surface of a drinks receptacle bottom, such that each beverage delivered to the drinks receptacle is delivered from the bottom towards the top of the receptacle without turbulences or splashes.

In a further aspect, the present invention relates to ingredient container. The ingredients container is adapted to receive a liquid from a beverage dispenser. The ingredients container comprises a dilute-able concentrate and a delivery tube. The ingredients container is adapted to dispense a beverage formed upon dilution of the dilute-able concentrate with the liquid, via the delivery tube.

In a further aspect the present invention relates to a method for the manufacture of a multi-layered beverage. The method comprises providing a plurality of ingredients containers each comprising an ingredient, for instance a juice, an infusion, or a dilute-able concentrate. If the ingredient is a dilutable concentrate, said dilute-able concentrate is diluted with a liquid to form a beverage, such that each beverage has a density different to each other beverage. Then, dispensing separately and sequentially a lower density beverage prior to dispensing a higher density beverage to the drinks receptacle, via the delivery tube, the dispensing end of which is placed adjacent to the internal surface of a drinks receptacle bottom, such that each beverage delivered to the drinks receptacle is delivered from the bottom towards the top of the receptacle without turbulences or splashes.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

For a complete understanding of the present invention and the advantages thereof, reference is made to the following detailed description taken in conjunction with the accompanying figures.

It should be appreciated that the various aspects of the detailed description as disclosed herein are illustrative of the specific ways to make and use the invention and do not limit the scope of invention when taken into consideration with the claims and the following detailed description. It will also be appreciated that features from one aspect of the invention may be combined with features from other aspects.

As used herein, the singular form of a word includes the plural and vice versa unless the context clearly dictates otherwise. Thus, the references "a", "an" and "the" are generally inclusive of the plurals of the respective terms. Similarly, the words "comprise", "comprises" and "comprising" are to be interpreted inclusively rather than exclusively. Similarly, the term "examples," particularly when followed by a listing of terms is merely exemplary and illustrative and should not be deemed to be exclusive or comprehensive.

Unless defined otherwise, all technical and scientific terms, terms of the art and acronyms as used herein have the meanings commonly understood by one of ordinary skill in the art.

Any references cited or referred to herein are entirely incorporated herein by reference to the extent allowed by law. The discussion of those references is intended to summarise the assertions made therein. No admission is made that any such references or any portion thereof are relevant material or prior art. The right to challenge the accuracy and pertinence of any assertion of such references as relevant material or prior art is specifically reserved.

Figure 1:
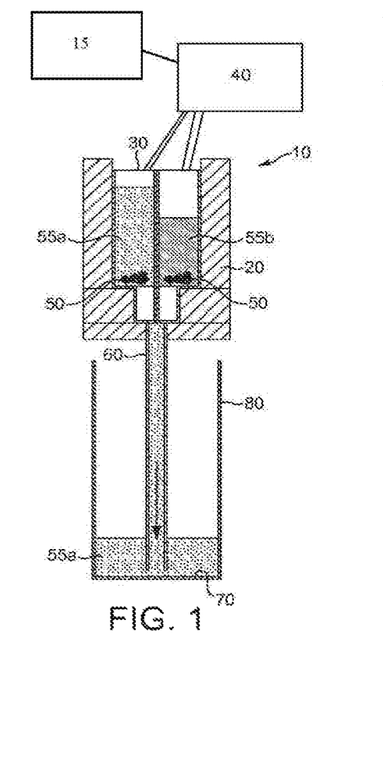
FIGS. 1, 2, 3, 4 show a beverage dispensing system according to an aspect of the present invention.

The present invention relates to providing a multi-layered beverage 90 with a beverage dispensing system 10 as shown in FIG. 1. The beverage dispensing system 10 comprises a plurality of ingredients containers 30. A liquid supply 40 is adapted to provide a liquid to the plurality of ingredients containers 30. Furthermore the plurality of ingredients containers 30 comprise a dilute-able concentrate 50 which when diluted with the liquid forms a beverage 55 with a density different to each other beverage 55 formed in each other one of the plurality of ingredients containers 30. The beverage dispensing system 10 is adapted to dispense separately and sequentially a lower density beverage SSa prior to dispensing a higher density beverage SSb. The beverages are dispensed via a delivery tube 60, the dispensing end of which is placed adjacent to the internal surface 70 of the bottom of a drinks receptacle 80, such that each beverage delivered to the drinks receptacle is delivered from the bottom towards the top of the receptacle without turbulences or splashes.

The beverage dispensing system 10 can comprise a support/enclosing member 20 which is adapted to selectively engage the plurality of ingredients containers 30. The selective engagement of the plurality of ingredients containers 30 can be achieved, for example by having a mechanical index to correctly position the plurality of ingredients containers 30 in the support/enclosing member 20.

The plurality of ingredient containers 30 can be in the form of any one of a pouch, a sachet, a capsule, a bag-in-box, or any combinations thereof. Although in the figures only two ingredient containers 30 are shown, there can of course be more.

The liquid supply 40 is adapted to provide the liquid to the plurality of ingredients containers 30. The liquid supply 40 can be water or can be an alcoholic based liquid. The liquid supply 40 can provide the liquid by pumped means or by gravity to the plurality of ingredients containers 30. It is to be appreciated that a different liquid can be provided to a different one of the plurality of ingredients containers 30.

Within each one of the plurality of ingredient containers 30 is a dilute-able concentrate 50. The dilute-able concentrate 50 can be for e.g. in the form of a powder dilute-able concentrate, for e.g. a liquid dilute-able concentrate, for e.g. a gel-type dilute-able concentrate or even for e.g. a paste-type dilute-able concentrate. The dilute-able concentrate 50 is to be diluted in each one of the plurality of ingredient containers 30 by the liquid from the liquid supply 40 to from a respective beverage 55.

Each one of the plurality of ingredient containers 30 is sealed to maintain a freshness of the dilute-able concentrate 50. When the liquid supply 40 provides the liquid to the plurality of ingredients containers 30, the seal is broken by a pressure of the liquid, consequently a beverage 55 is formed within each one of the plurality of ingredients containers 30 by an interaction of the dilute-able concentrate 50 and the liquid.

The dilute-able concentrate 50 can confer to the respective beverage 55 any of for e.g. a certain colour and/or for e.g. a flavour and or for e.g. a texture or any combination thereof. In this regards, the dilute-able concentrate 50 can be for e.g. a powder to provide for e.g. a fruit flavour, the dilute-able concentrate 50 can be for e.g. a syrup to provide for e.g. a caramel flavour, the dilute-able concentrate 50 can be for e.g. a syrup to provide for e.g. a strawberry flavour, the dilute-able concentrate 50 can be for e.g. a colorant, the dilute-able concentrate 50 can be for e.g. a substance that forms a foam, the dilute-able concentrate 50 can be for e.g. a puree, the dilute-able concentrate 50 can for e.g. provide a tea flavour, the dilute-able concentrate 50 can for e.g. be used to provide a milk based product. Thus it is to be appreciated that the dilute-able concentrate 50 can be used to provide any of a certain colour and/or flavour and or texture or any combination thereof to the respective beverage 55.

As shown in the FIGS. 1 to 5 there is only two of the plurality of ingredient containers 30 which provide two beverages 55a and 55b. However three of the plurality of ingredient containers 30 can be used which provide three beverages 55a, 55b and 55c. However four of the plurality of ingredient containers 30 can be used which provide four beverages 55a, 55b, 55c and 55d.

Thus the number of ingredient containers 30 results in the respective number of beverages 55. In the FIGS. 1 to 5, beverage 55a has a density lower than beverage 55b. Of course it is to be appreciated that more than two of the plurality of ingredient containers 30 can be present as noted above.

It is essential that each beverage 55 formed within each one of the plurality of ingredients containers 30 have a density different from each other beverage 55.

To ensure that each beverage 55 formed within each one of the plurality of ingredients containers 30 has a density different from each other, different protocols may be used.

One protocol would be that the beverage dispensing system 10 would use a predetermined amount of liquid for each one of the plurality of ingredient containers 30 to form the respective beverage 55. In this instance the properties and quantities of the dilute-able concentrate 50 within each one of the plurality of ingredient containers 30 is such that the resulting beverage 55 would have a pre-determined density. In such a protocol the plurality of ingredient containers 30 would be provided as a set which cannot be modified.

A further protocol would be that the beverage dispensing system 10 may alter the amount of liquid for each one of the plurality of ingredient containers 30 to form the respective beverage 55. In such a protocol the plurality of ingredient containers 30 would be provided at a set which cannot be modified.

The protocol to be followed for determining if a fixed volume of liquid is added to each one of the plurality of ingredient containers 30 or if a variable amount of liquid is added to each one of the plurality of ingredient containers 30 can be determined by the beverage dispensing system 10, by means of, for example a scanner, which reads a code on the plurality of ingredient containers 30. In this way the beverage dispensing system 10 can determine (by means of software or hardware within the beverage dispensing system 10) the relative densities of the beverages 55 in each one of the plurality of ingredient containers 30.

The beverage dispensing system 10 is adapted (by means of software or hardware within the beverage dispensing system 10) to dispense separately and sequentially a lower density beverage prior to dispensing a higher density beverage. The beverages are dispensed via the delivery tube 60 which is disposed proximally to the internal base 70 of the drinks receptacle 80.

The drinks receptacle 80 is manufactured from a translucent material or a transparent material. Such a material may be glass. The drinks receptacle 80 can be of the form known in the art such as a tumbler drinks receptacle 80 or stemware drinks receptacle 80.

In FIG. 1, it is shown that separately the lower density beverage 55a is dispensed via the delivery tube 60 which is disposed proximally to 25 the internal base 70 of the drinks receptacle 80.

Figure 2:
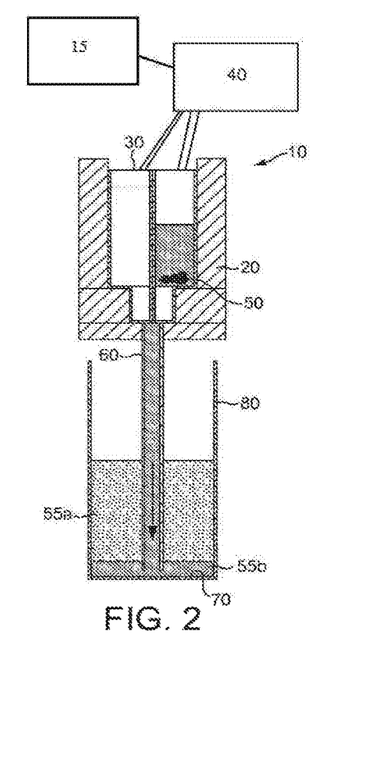

In FIG. 2 it is shown that separately and sequentially to dispensing the lower density beverage 55a, a higher density beverage 55b is then dispensed via the delivery tube 60 which is disposed proximally to the internal base 70 of a drinks receptacle 80.

Figure 3:
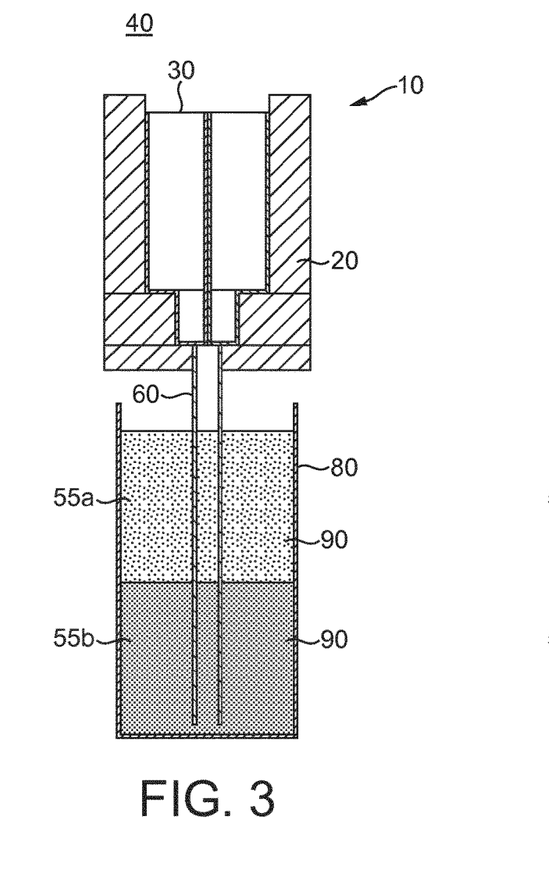

Following the addition of the beverages 55a, 55b, separately and sequentially in the order of the lower density beverage 55a to the higher density beverage 55b and so on, the manufacture of the multi-layered beverage 90 is achieved as shown in FIG. 3. Separately and sequentially further beverages (55c, 55d, and any other subsequent beverage having a different density and composition) can be added with respective higher densities to form more layers.

The dispensing of the beverages 55 from the plurality of ingredient containers 30 can be performed by the utilisation of a pump or by gravity. The pump would be part of the beverage dispensing system 10. A dispensing pressure can be adjusted by means of an adjustable pump to ensure that dispensing of the beverages 55 is relatively slow so as to ensure non-mixing of the separate beverages. Gravity has the advantage that dispensing of the beverages 55 is relatively slow so as to ensure non-mixing of the separate beverages.

Opening of each container to dispense the corresponding beverage can be performed by opening a valve (not illustrated in the drawing) located at the bottom end of said container, which is actuated by the dispensing system 10. Alternatively, each container can be opened by means of a piercing tool which is part of dispensing system, which pierces or otherwise breaks or tears a breakable bottom portion of each container.

A stability of the multi-layered beverage 90 is observed when at least two beverage layers 55a, 55b are visually apparent through the drinks receptacle 80 over a period of time of more than two minutes, preferably more than five minutes and most preferably more than ten minutes.

A relative height of the support/enclosing member 20 can be adjusted to ensure that the delivery tube 60 is disposed proximally to the internal base 70 of the drinks receptacle 80.

Figure 4:
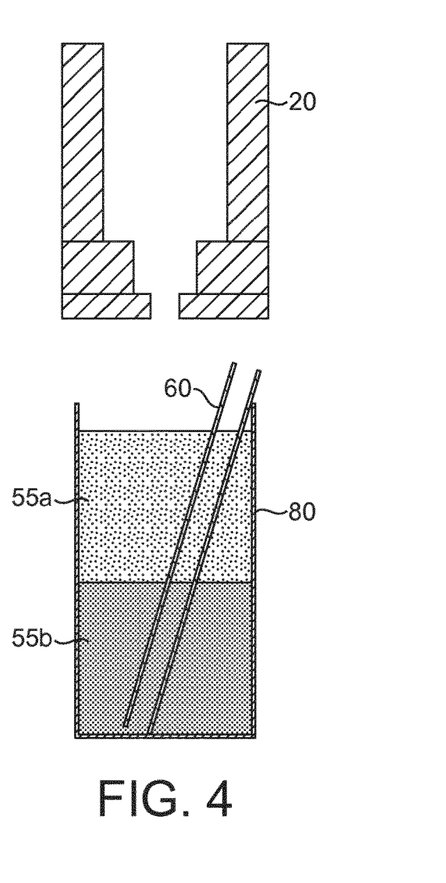

The delivery tube 60 can be attached to the support/enclosing member 20 or to the plurality of ingredients containers 30. In either case the delivery tube 60 is removable from the support/enclosing member 20 or from the plurality of ingredients containers 30. Since the delivery tube 60 is removable, the delivery tube 60 can be used as a straw by a consumer to drink the multi-layered beverage 90 as shown in FIG. 4. Detaching the delivery tube 60 from the support/enclosing member 20 or from the plurality of containers 30, can be performed manually by the consumer (in that case, the delivery tube will be attached to said member 20 or containers 30 via a pre-cut or otherwise weakened zone, which is easy to break manually). Alternatively, detaching said delivery tube can be performed by the delivery system itself, automatically when the dispensing of the beverages into the receptacle is complete. In that case, cutting the delivery tube from support/enclosing member 20 or from the plurality of containers 30, can be performed using a specific cutting tool that is part of the delivery system, such as a knife for instance.

The delivery tube 60 has an internal diameter in the range of 4 mm to 6 mm.

Figure 5:
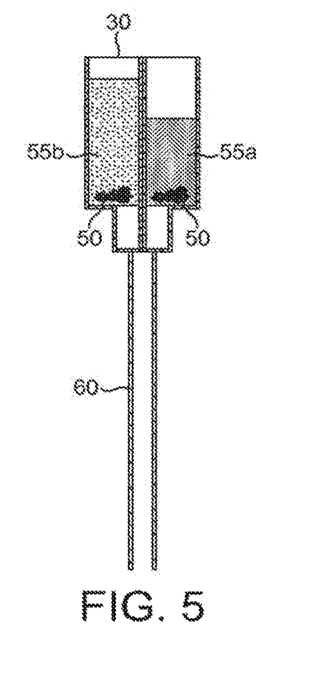
FIG. 5 shows an ingredients container according to an aspect of the present invention.

FIG. 5 shows the ingredient container 30 according to an aspect of the present invention. The ingredient container 30 can be adapted for use with the beverage dispensing system 10. As noted the ingredients container 30 is adapted to receive a liquid from the beverage dispenser 10. The ingredients container 30 comprises the dilute-able concentrate 50 and the delivery tube 60 attached to its bottom end. Furthermore the ingredients container 30 is adapted to dispense a beverage 55 which is formed upon dilution of the dilute-able concentrate 50 with the liquid, via the delivery tube 60. The diluting liquid is injected from the upper side of the containers 30, by the beverage dispensing system. The source of diluting liquid can be outside of the dispensing system, for instance it can be pumped from a tap water source to which the dispensing system is fluidly connected. Or alternatively, the diluting liquid can be sourced form a specific reservoir of liquid which is integrated to the dispensing system. The diluting liquid is preferably mineral water, however, other types of edible liquids suitable for diluting a food concentrate can be used.

Furthermore the ingredients container 30 can be any one of a pouch, a sachet or a capsule.

The delivery tube 60 of the ingredient container 30 has an internal diameter in the range of 4 mm to 6 mm.

Furthermore as noted above the delivery tube 60 is removable from the ingredients container 30.

In a further aspect the present invention relates to a method for the manufacture of a multi-layered beverage 90. The method comprises:

providing the plurality of ingredients containers 30 each comprising the dilute-able concentrate 50.

The dilute-able concentrate 50 is diluted with a liquid to form a beverage 55, such that each beverage 55 has a density different to each other beverage 55.

The delivery tube 60 is provided and disposed proximally to the internal base 70 of the drinks receptacle 80.

Then, dispensing separately and sequentially the lower density beverage 55a prior to dispensing the higher density beverage 55b, c, d, e to the drinks receptacle 80, via the delivery tube 60.

Figure 6:
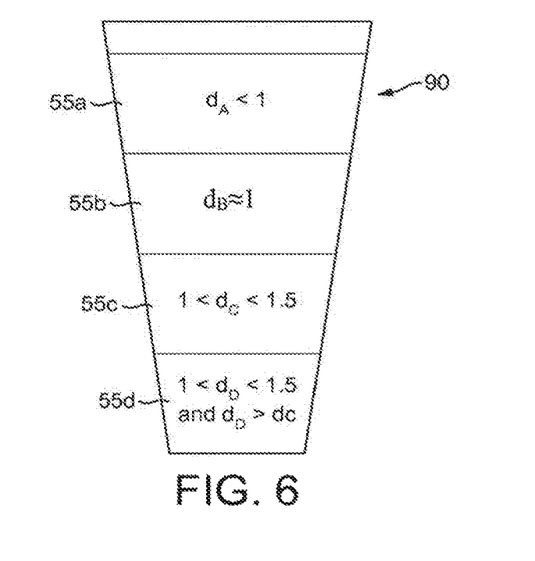
FIGS. 6, 7 show a multi-layered beverage according to an aspect of the present invention.

FIG. 6 shows the multi-layered beverage 90 according to an aspect of the present invention. The number of ingredient containers 30 results in the respective number of beverages 55, therefore to manufacture the multi-layered beverage 90 as shown in FIG. 6 would require four ingredient containers 30, resulting in the respective number of beverages 55a-55d and thus consequential layers.

Relatives densities of the beverages 55a-55d are exemplified in FIG. 6 as are the resulting different types of beverages 55a-55d. Beverage 55a (e.g. alcohol, foam) has a density (dA<1) lower than a density (dB≈1) of beverage 55b (e.g. coloured water). Beverage 55b (e.g. coloured water) has a density (dB≈1) lower than a density (1<dC<1.5) of beverage 55c (e.g fruit juice). Beverage 55c (e.g. fruit juice) has a density (1<dC<1.5) lower than a density (1<dD<1.5 and dD>dC) of beverage 55d (e.g. syrup).

As noted above, the delivery tube 60 is provided and disposed proximally to the internal base 70 of the drinks receptacle 80.

The beverages 55a-55d are dispensed separately and sequentially such that the lower density beverage 55a is dispensed prior to dispensing the higher density beverage 55b, then 55c then 55d to the drinks receptacle 80, via the delivery tube 60; thus forming the multi-layered beverage 90 as shown in FIG. 6.

Figure 7:
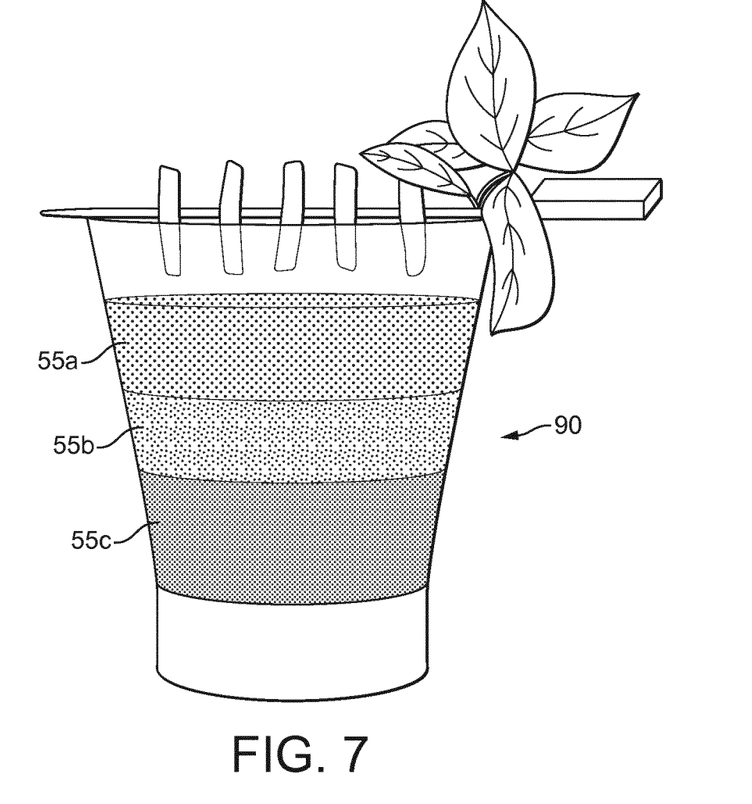

FIG. 7 shows the multi-layered beverage 90 according to an aspect of the present invention. The number of ingredient containers 30 results in the respective number of beverages 55, therefore to manufacture the multi-layered beverage 90 as shown in FIG. 7 would require three ingredient containers 30, resulting in the respective number of beverages 55a-55c and thus consequential layers.

Relatives densities of the beverages 55a-55c are exemplified in FIG. 7 as are the resulting different types of beverages 55a-55c. Beverage 55a (e.g. tomato beverage) has a density (dA<1) lower than a density (dB≈1) of beverage 55b (e.g. carrot beverage). Beverage 55b (e.g. carrot beverage) has a density (dB≈1) lower than a density (d>1) of beverage 55c (e.g strawberry beverage).

As noted above, the delivery tube 60 is provided and disposed proximally to the internal base 70 of the drinks receptacle 80, that is to say the dispensing end of the delivery tube 60 is functionally placed adjacent to the internal surface of the bottom 70 of a drinks receptacle 80, such that each beverage delivered to the drinks receptacle is delivered from the bottom towards the top of the receptacle without turbulences or splashes.

The beverages 55a-55c are dispensed separately and sequentially such that the lower density beverage 55a is dispensed prior to dispensing the higher density beverage 55b, then 55c to the drinks receptacle 80, via the delivery tube 60; thus forming the multi-layered beverage 90 as shown in FIG. 7.

The invention has the advantage that the beverages are dispensed at the base of the drinks receptacle 80 in a gentle manner and avoiding any significant turbulence of the beverages in the drinks receptacle 80. Avoiding significant turbulence ensures that when the beverages are dispensed separately and sequentially in an order of a lower density beverage to a higher density beverage any mixing of the beverages is avoided and the multi-layered beverage 90 is successfully formed.

The invention has the advantage that since the beverages 55a, 55b, 55c (and any other beverage that may be dispensed) are dispensed at the internal base 70 of the drinks receptacle 80 in the order from a lower density beverage 55a prior to a higher density beverage 55b, any subsequent dispensed beverage (i.e. higher density beverage 55b) pushes the lower density beverage 55a upwardly in the drinks receptacle 80, therefore eliminating any mixing of the beverage layers. Generally, the principle of the invention is that any newly dispensed beverage pushes the preceding—already dispensed—beverage upwardly in the receptacle.

Having thus described the present invention and the advantages thereof, it should be appreciated that the various aspects and embodiments of the present invention as disclosed herein are merely illustrative of specific ways to make and use the invention.

Notwithstanding the above described embodiments, the invention also encompasses the possibility to produce multi-layered beverages using other types of ingredients such as fruit or vegetables juices, tea or coffee infusions, and the like.

The different beverages which are dispensed from the ingredient containers towards the consumer drink cup, can be selected either by selecting a recipe from a control panel 15 of the machine, or by selecting individual ingredients.

In the first case, the recipe is contained in a memorized program of the machine, and when selected, the program actuates the machine automatically to withdraw the various ingredients necessary to produce the selected recipe from the corresponding ingredient containers, and sequentially distribute said ingredients depending on their respective densities, according to the principle of the invention.

In the second case, the machine compiles the different ingredients selected by the user, and distributes them in the consumer's drink cup, in a dispensing sequence that takes into account their respective densities, according to the principle of the invention. In that case, there is a requirement that each ingredient container be identified, for the machine to recognize which density corresponds to which ingredient that will be dispensed, so that the machine can then automatically sort out the different ingredients having various densities, and distribute them sequentially according to the principle of the invention. In one embodiment, each containers comprises an identification means, such as a dedicated barcode, or an RFID tag, which contains information about the type of ingredient, and in particular its density.

If the ingredient contained in a container is a dilutable ingredient, the machine dilutes this ingredient to a certain level, by varying the speed of the water jet introduced therein, or its temperature. In one embodiment, the speed of the water jet is high and produces a foam which is then distributed with the beverage thus created. Ultimately, a foam layer will be created as an addition to the rest of the ingredient layers, which participates to the aesthetics of the resulting product in the cup. Preferably, only the first ingredient dispensed in the glass or cup is foamed, so that the foam (which has a lower density than that of the other beverage layers, stays as a top layer, and does not mix with the rest of the beverage layers which have a greater density.

As a principle, multilayer beverages such as cocktails must be stirred immediately before drinking, to mix the flavours. As a result of this principle, it is not absolutely necessary that each of the individual beverage layers that are dispensed in the cup has a density which provides optimum organoleptic properties as such. Instead, what is important is that the final density of the beverage, and the final ratio between ingredients (flavours, sugar, etc) on one side, and water contents on the other side be optimal when considering the final volume of the beverage in the cup.

For instance, some beverage layers can be dispensed in a more concentrated (i.e. less diluted), hence more dense form, while some others may be more diluted when dispensed individually in the cup or the glass. Therefore each individual layer when dispensed by the machine, may not have the most appropriate density and water dilution to be consumed separately from the other beverage layers. However, it is essential that once stirred and mixed at the time of consumption, the total water content in the glass or cup, as well as the amount of each ingredient solids (in particular flavours) and sugar, be optimized to provide the most pleasant taste and flavour to the consumer.

Correct dosing of the ingredients shall therefore take into account the in-cup (or in-glass) total contents of water and sugar, and also the final concentration of each ingredient solids (in particular flavours).

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A beverage dispensing system comprising:
   a plurality of ingredients containers each comprising
      (i) a valve,
      (ii) a beverage concentrate, and
      (iii) an ingredient identification identifying a relative density of the beverage concentrate,
   each of the plurality of ingredients containers configured to be inserted in a predetermined discrete cavity of the beverage dispensing system and further configured to dispense a beverage; and
   an electronic control board programmed to automatically determine, based on reading of the ingredient identification, an amount of a liquid to add to each one of the plurality of ingredients containers so that a first ingredients container of the plurality of ingredients containers dispenses a first beverage with a lower density than a second beverage formed in a second ingredients container, the control board comprising a program for controlling an opening and a closing of the valve of the first ingredients container, and a memory for storing a recipe as a sequence of ingredient dispensing,
   wherein the electronic control board is programmed to actuate the opening and the closing of the valve of the first ingredients container to dispense separately and sequentially the first beverage prior to dispensing the second beverage, the system further comprising a delivery tube comprising a dispensing end, the dispensing end is placed adjacent to an internal surface of a bottom of a drinks receptacle, such that each beverage from each of the plurality of ingredients containers delivered to the drinks receptacle through the delivery tube is delivered to the bottom of the drinks receptacle towards the top of the receptacle without turbulences or splashes.

2. The beverage dispensing system according to claim 1, comprising a support member adapted to selectively engage the plurality of ingredients containers.

3. The beverage dispensing system according to claim 1, wherein the ingredient identification includes a position of each of the plurality of ingredients containers in a respective container cavity of the system, relative to the position of each of the other of the plurality of ingredients containers.

4. The beverage dispensing system according to claim 1, further comprising a code reader, wherein the ingredient identification is a code readable by the code reader, the code selected from the group consisting of: a two-dimensional barcode, a three-dimensional barcode, a color code, a mechanical code, and combinations thereof.

5. The beverage dispensing system according to claim 1, wherein each ingredient is selected from the group consisting of: a juice, a diluted syrup, a dilutable concentrate, an infusion, a liquid coffee, and combinations thereof.

6. The beverage dispensing system according to claim 5, wherein the beverage dispensing system further comprises a liquid supply configured to provide the liquid to at least one of the plurality of ingredients container, and wherein the dilutable concentrate is in a form selected from the group consisting of: a powder dilutable concentrate, a liquid dilutable concentrate, a gel-type dilutable concentrate, a paste-type dilutable concentrate, and the dilutable concentrate forms a beverage of a predetermined density when diluted with the liquid.

7. The beverage dispensing system according to claim 1, wherein each of the plurality of ingredient containers is selected from the group consisting of: a pouch, a sachet, a capsule, a refillable ingredient chamber built-in the system, and combinations thereof.

8. The beverage dispensing system according to claim 1, wherein the delivery tube is attachable to the support member.

9. The beverage dispensing system according to claim 1, wherein the delivery tube has an internal diameter of 4 mm to 6 mm.

10. The beverage dispensing system according to claim 1, wherein the delivery tube is removable from the support member.

11. The beverage dispensing system according to claim 1, wherein the liquid is selected from the group consisting of: water, an alcoholic based liquid and any combination thereof.

12. The beverage dispensing system according to claim 1, wherein the delivery tube is attachable to the plurality of ingredients containers.

13. The beverage dispensing system according to claim 1, wherein the delivery tube is removable from the plurality of ingredients containers.

* * * * *